United States Patent [19]

Wallaeys et al.

[11] Patent Number: 5,132,332
[45] Date of Patent: Jul. 21, 1992

[54] METHOD FOR PREPARING HARD POLYURETHANE AND POLYISOCYANURATE FOAMS USING CHLOROPROPANE BLOWING AGENT AND NON-SILICON FOAM STABILIZER

[75] Inventors: Bart Wallaeys, Ghent; Eddie DuPrez, Brakel, both of Belgium

[73] Assignee: Recticel, Sint-Peters-Woluwe, Belgium

[21] Appl. No.: 487,503

[22] Filed: Mar. 2, 1990

[30] Foreign Application Priority Data

Mar. 3, 1989 [BE] Belgium .............................. 08900227
Sep. 22, 1989 [BE] Belgium .............................. 08901020

[51] Int. Cl.$^5$ .............................................. C08G 18/08
[52] U.S. Cl. ................................... 521/109.1; 521/114; 521/115; 521/116; 521/117; 521/124; 521/125; 521/128; 521/131; 521/163; 521/172; 521/174

[58] Field of Search .................... 521/109.1, 114, 115, 521/116, 117, 124, 125, 128, 131, 163, 172, 174

[56] References Cited

FOREIGN PATENT DOCUMENTS 1416089 11/1964 France .

Primary Examiner—Maurice J. Welsh
Assistant Examiner—Rachel Johnson
Attorney, Agent, or Firm—Sughrue, Mion, Zinn, Macpeak & Seas

[57] ABSTRACT

A method for preparing hard polyurethane and polyisocyanurate foams wherein an isocyanate and an active hydrogen containing compound are made to react in the presence of a catalyst, a foam stabilizer and a blowing agent which contains chloropropane, the used foam stabilizer being mainly of the non silicon type.

11 Claims, No Drawings

METHOD FOR PREPARING HARD POLYURETHANE AND POLYISOCYANURATE FOAMS USING CHLOROPROPANE BLOWING AGENT AND NON-SILICON FOAM STABILIZER

The invention relates to a method for preparing hard polyurethane and polyisocyanurate foams, wherein an isocyanate and an active hydrogen containing compound, such as a polyol, are made to react in the presence of a catalyst, a foam stabilizer and a blowing agent which contains chloropropane.

The use of chloropropane, on laboratory scale, as blowing agent for the polyurethane foam production, has already been mentioned in Belgian patent No. 656.018 of Mobay Chemical Company.

However, it appeared that when manufacturing such a foam on an industrial scale by using chloropropane as blowing agent, an important shrinkage is observed especially for foams having the most usual densities of about 30 kg/m³. In a rather unexpected way, it has been determined that such a shrinkage cannot be observed on laboratory scale, such as it is the case in said Belgian patent.

Consequently, an object of the invention is to remedy this important drawback for the manufacturing of polyurethane foams and/or polyisocyanate foams on an industrial or semi-industrial scale.

To this end, use is made of a foam stabilizer being mainly of the non silicon type.

Suitably, this non silicon based foam stabilizer is formed by at least one copolymer having following general structural formula:

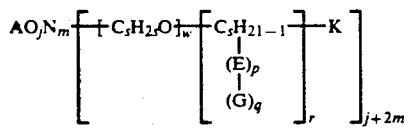

wherein:
A is a cyclic or acyclic group having:
1 to 12 carbon atoms
2 to [26-(j+m)] hydrogen atoms,
0 to 4 oxygen atoms,
0 to 2 nitrogen atoms,
E is a group having as general structual formula:

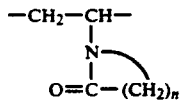

wherein n=3 to 5,
G is a group having as general structural formula:

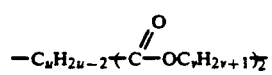

wherein
u=2 or 3
v=2 to 9,
K is a group having as structural formula:

wherein R is an acyclic or cyclic radical having 1 to 18 carbon atoms and x=3 or 4,
wherein further:
j=0 to 8
m=0 to 4
$1 \leq j+m \leq 8$
s=2 to 4
w=1 to 200
p=1 to 10
q=1 to 10
r=1 to 50.

In another embodiment of the invention, use is made of non silicon based foam stabilizers of the non ionic, anionic and/or cationic type, such as defined in claims 4 to 6.

In a more particular embodiment of the invention, substantially only non silicon based components are used as foam stabilizers.

Other particularities and advantages of the invention will become apparent from the following more detailed description wherein some specific examples of the method for preparing polyurethane foam and polysicyanurate foam according to the invention are described; this description is only given by way of example and does not limit the scope of the invention.

For the production of these polyurethane foams, use is essentially made of the reaction between a polyalcohol and an isocyanate in the presence of the appropriate catalysts.

Beside the polyisocyanate, the polyols, the typical catalysts and the blowing agents, use is furthermore made of foam stabilizers, fire retardant additives, etc.

The organic polyisocyanate compounds are of the $R(NCO)_n$ type, wherein n>2 and R represents an aliphatic or aromatic group. Preferably, use is made of diisocyanates or polyisocyanates, having an average of 2 to 4 isocyanate groups per molecule. A typical example hereof is diphenylmethane-4,4'-diisocyanate (MDI) and mixtures of the latter with its polymeric forms ("crude" MDI), which are usually applied in the rigid polyurethane foam or polyisocyanate foam manufacture. In certain cases, use can also be made of prepolymerized forms of MDI.

In principle, each molecule containing active hydrogen groups such as: R—OH, R—COOH, R—SH, $R_2$—NH, R—$NH_2$, R—SH, . . . can serve as reaction substrate. Preferably, there is started from polyalcohols of the polyetherpolyol or the polyesterpolyol type or mixtures thereof. (Polyetherpolyols, based on aromatic chain initiators, are furthermore preferred).

A molecular weight of at least 150, and preferably between 500 and 5000, is typical. The functionality is always higher or equal to 2 and a hydroxyl number (IOH) comprised between 25 and 1000 being an important characteristic.

For the polyurethane preparation, use is made of an isocyanate with an index approaching the stoechiometric ratio, i.e. 95 à 110, whereas the polyisocyanurate preparation requires a much higher index in order to allow the trimerization reaction of the isocyanate as such. This isocyanate index is usually higher than 150.

In order to obtain the typical foam structure, use is made of a chemical or physical blowing agent. Usually $H_2O$, which liberates "in situ" $CO_2$ by reaction with isocyanate, is applied as chemical blowing agent. As physical blowing agents, low boiling organic liquids are used, which evaporate as a result of the urea, urethane and trimerisation reactions and contribute to the formation of the typical foam structure.

Chloro-fluoro-hydrocarbon compounds (CFC's) are commonly used as physical blowing agents such as for example trichlorofluoromethane, trichlorotrifluoroethane, dichlorotrifluoroethane, dichlorofluoromethane, or other analogous compounds or combinations thereof.

In this invention, a considerably fraction of the CFC's or the totality of the latters is replaced by chloropropane. Also other blowing agents, such as for example pentane, isopentane, etc . . . , mixed with chloropropane, can be used. The total blowing agent amount which is used, is dependent upon the foam density to be obtained and the molecular weight of the blowing agent. Amounts between 1 and 50% by weight and preferably between 1 and 30% by weight, are typical.

Contrary to the teachings of the Mobay patent, an excess of non silicon based cell stabilizers is used here, preferably without the presence of the classic, silicon based cell stabilizers. As it appears from the examples, it is impossible to manufacture, with these classic substances and on an industrial scale, foams which are dimensionally stable, especially in the low density range around 30 kg/m$^3$. Foam stabilizers of the non silicon type are for example described in U.S. Pat. No. 4,091,030 of Air Products and Chemicals, Inc. These foam stabilizers are copolymers having as general structural formula:

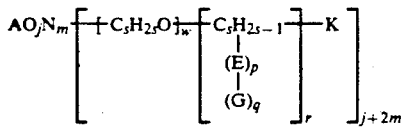

wherein:
A is a cyclic or acyclic group having:
  1 to 12 carbon atoms
  2 to [26-(j+m)] hydrogen atoms,
  0 to 4 oxygen atoms,
  0 to 2 nitrogen atoms,
E is a group having as general structual formula:

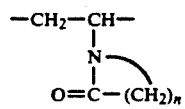

wherein n=3 to 5,
G is a group having as general structural formula:

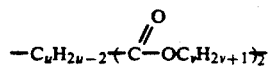

wherein
u=2 or 3
v=2 to 9,
K is a group having as structural formula:

wherein R is an acyclic or cyclic radical having 1 to 18 carbon atoms and x=3 or 4,
wherein further:
  j=0 to 8
  m=0 to 4
  $1 \leq j+m \leq 8$
  s=2 to 4
  w=1 to 200
  p=1 to 10
  q=1 to 10
  r=1 to 50.

An example of such a compound is the molecule wherein group E is N-vinyl-2-pyrrolidinone and group G is dibutylmaleate. These compounds are used in the present invention under their brand names LK221 and LK443. Preferably amounts of 0.1-10 parts by weight and more specifically 0.1 to 4 parts by weight are used per 100 parts by weight polyol.

Other examples of non ionic, non silicon stabilizers are:
condensation products of alkylphenols with ethylene oxide having as general structural formula:

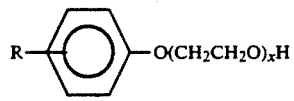

wherein R comprises 8 to 14 C atoms and x varies from 1 to 40
mono-, di- or tri-esters of condensation products of sorbitan with ethylene oxide. Preferably laurate, palmitate, stearate or oleate esters are used.
condensation products of fatty acids with ethylene oxide, such as for example the condensation products of stearic acid with ethylene oxide;
condensation products of alcohols with ethylene oxide, with a hydrophobic chain containing usually 12 to 18 C atoms and being condensed with (n-3) moles ethylene oxide (n indicating the number of C atoms of the hydrophobic chain);
condensation products of amides with ethylene oxide, such as for example the diethanolamine monostearate derivative condensed with 2 moles ethylene oxide;
condensation products of amines with ethylene oxide, such as for example the products starting from oleylamine and ethylene oxide;
condensation products of mercaptane derivatives and ethylene oxide;
acetylene derivatives, such as for example the product having as structural formula:

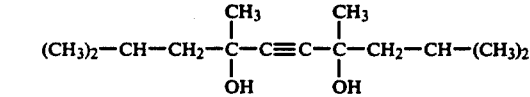

condensed with 0 to 40 moles ethylene oxide.
Besides the non ionic stabilizers, also anionic or cationic stabilizers are appropriate. The following compounds can be mentioned for use as anionic components:

$ROSO_3^\ominus M^\oplus$
$R_2OSO_3^\ominus M^\oplus$
$R-SO_3^\ominus M^\oplus$ $R-\underset{\underset{O}{\|}}{C}-OSO_3^\ominus M^\oplus$ $C_7F_{15}COO^\ominus NH_4^\oplus$

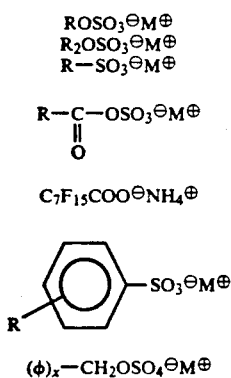

$(\phi)_x-CH_2OSO_4^\ominus M^\oplus$ wherein R is an alkyl radical having 8 to 20 C atoms and wherein M+ represents a counterion, such as for example H+, K+, Na+, NR4+, NH4+, . . . .

These compounds can comprise furthermore also condensation chains with ethylene oxide.

Important, appropriate cationic components are:
amines in the shape of acetate or chlorohydrate
quaternary ammonium salts
pyridine and quinoline derivatives
derivatives of ethanolamines.

As catalyst, use is made of tertiary amine compounds, such as for example N,N'-dimethylcyclohexylamine, diaminobicyclo-octane (DABCO), etc . . . , or metal, alkali metal or alkaline-earth metal salts of organic or anorganic origin, such as for example potassium octoate, dibutyltin dilaurate, Fomrez UL 28 (Trademark of Witco), Sn-mercaptides, etc . . . .

The amounts which are used here are dependent on the catalytic activity and are typically comprised between 0.01 and 10 parts by weight, and more specifically between 0.01 and 4 parts by weight, per 100 parts by weight polyol.

Extra additives, such as for example fire retardants (phosphor and halogen containing additives or polyols), smoke suppressors, additional cross-linkers, fillers, diluents, etc . . . , can always be added in order to give the final product certain specific features.

This invention allows the production of foams either according to a continuous process, or according to a discontinuous process and as well in the shape of whether or not coated plates as in the shape of blocks, in situ moulded pieces or spayed foam.

The physical properties (and the respective norm) which have been measured for the hard foams, are grouped in Table 1.

TABLE 1

| Physical properties, units and corresponding norms. | | |
|---|---|---|
| Physical property | Unit | Norm |
| Core density | kg/m³ | DIN 53420 |
| Compression - Hardness | kPa | DIN 53421 |
| Thermal conductivity (λ) | W/mK | ISO2581 |
| Dimensional stability | % | ISO 2796 |
| Shrinkage at +4° C. | % | Recticel method* |
| Closed cells | % | ASTM D 2856 |
| Fire behaviour | self-extinguishing | ASTM D 1692 |
|  | B2/B3 class | DIN 4201 B2/B3 |
| LOI | % | ASTM D 2863 |
| Friability (after 10') | % | ASTM C 421 |

*For the evaluation of the shrinkage phenomenon, a quicker evaluation method has been drawn up wherein possible dimensional instabilities have been enhanced by sawing up the polyurethane and the polyisocyanurate foam pieces immediately after the manufacturing into blocks of about 15 cm × 5 cm × 5 cm. These pieces were immediately conditioned at 4° C. during 24 hours. In this way, the possible shrinkage which can occur in normal conditions one month after the manufacturing, could be accelerated. The percentage width alteration has been taken as unit.

In order to allow a sufficiently quick evaluation of the λ value under real conditions, use is made here of a fastened aging method.

The λ value is measured after the manufacturing of the foam, as well as in function of the time, the samples being conditioned at 70° C. during a time period untill 15 weeks after the manufacturing. This λ value is a stabilized value and can be correlated with the long term, final insulating value of the foam under actual application circumstances.

The use of 2-chloropropane is illustrated in the following examples.

EXAMPLES 1-9

In these examples, the replacement of Freon 11 (Trademark of Du Pont) by 2-chloropropane is illustrated in a conventional polyurethane system. At the same time, the effect of the cell stabilizer is emphasized here.

There has been started from a polyol based on an aliphatic initiator. The hydroxyl number of this polyol was 520 mg KOH/g polyol. For the isocyanate, there has been started from a "crude" MDI having an equivalent weight of 135. The isocyanate index was 110. The formulations are shown in Table 2. The foams have been prepared on a laboratorium scale, the mixture of polyol, blowing agent, catalyst, stabilizer and water having been mixed very intensively during about 10 seconds with the isocyanate at about 4000 revolutions per minute. The foaming mixture is then poured in a receptacle with dimensions: 30×30×20 cm.

The physical properties of the foams prepared in examples 1-9 are given in Table 3.

TABLE 2

| | formulations as used in examples 1-9 | | | | | | | | |
|---|---|---|---|---|---|---|---|---|---|
| Example | 1 | 2 | 3 | 4 | 5 | 6 | 7 | 8 | 9 |
| Composition: | | | | | | | | | |
| Polyol: XZ 95203.00 (1) | 100 | 100 | 100 | 100 | 100 | 100 | 100 | 100 | 100 |
| Trichloroethylfosfate | 10 | 10 | 10 | 10 | 10 | 10 | 10 | 10 | 10 |
| Silicon - Stabilizer B 1903 (2) | 1.2 | 1.2 | — | 1.2 | — | 1.2 | — | 1.2 | — |
| Non silicon - Stabilizer LK 221 (3) | — | — | 1.2 | — | 1.2 | — | 1.2 | — | 1.2 |
| Water | 1.2 | 1.2 | 1.2 | 1.2 | 1.2 | 1.2 | 1.2 | 1.2 | 1.2 |
| Dimethylcyclohexylamine | 3.0 | 3.0 | 3.0 | 2.8 | 2.9 | 2.9 | 2.8 | 2.9 | 2.8 |
| Freon (4) | 40 | 30 | 30 | 20 | 20 | 10 | 10 | — | — |
| 2-chloropropane | — | 5.2 | 5.2 | 10.5 | 15.8 | 15.8 | 15.8 | 21 | 21 |

TABLE 2-continued

| | formulations as used in examples 1-9 | | | | | | | | |
|---|---|---|---|---|---|---|---|---|---|
| Example | 1 | 2 | 3 | 4 | 5 | 6 | 7 | 8 | 9 |
| MDI 44V40 (5) | 157 | 157 | 157 | 157 | 157 | 157 | 157 | 157 | 157 |

(1) A Dow chemical trademark
(2) A Th. Goldschmidt AG trademark
(3) An Air Products trademark
(4) A du Pont trademark
(5) A Bayer trademark

TABLE 3

| | Physical properties of the foams manufactured in examples 1-9. | | | | | | | | |
|---|---|---|---|---|---|---|---|---|---|
| Example | 1 | 2 | 3 | 4 | 5 | 6 | 7 | 8 | 9 |
| Physical property | | | | | | | | | |
| Core density (kg/m$^3$) | 29.8 | 29.2 | 29.4 | 29.6 | 29.2 | 29.6 | 28.9 | 29.1 | 29.3 |
| Hardness (kPa) | 152 | 137 | 148 | 162 | 141 | 132 | 162 | 153 | 151 |
| Closed cells (%) | 93.1 | 92.6 | 93.8 | 93.7 | 92.7 | 91.9 | 94.2 | 94.0 | 92.8 |
| Friability (%) | 6.8 | 6.2 | 5.9 | 4.9 | 5.0 | 4.1 | 4.2 | 2.9 | 3.2 |
| Dimens. stability (%) | <3 | <3 | <3 | <3 | <3 | <3 | <3 | <3 | <3 |
| Shrinkage at 4° C. (%) | 1.2 | 3.2 | 1.4 | 9 | 1.1 | 6.3 | 1.5 | 7.1 | 1.4 |
| Fire class (ASTM D 1629) | S.E.* | S.E. | S.E. | S.E. | S.E. | S.E. | S.E. | S.E. | S.E. |
| Fire class (DIN 4102) | B3 | B3 | B3 | B3 | B3 | B3 | B3 | B3 | B3 |
| LOI | 22.5 | 22.5 | 22.5 | 22 | 22 | 22.5 | 22 | 22 | 22 |
| λ initial (W/mK) | 0.0200 | 0.0198 | 0.0194 | 0.0209 | 0.0205 | 0.0212 | 0.0215 | 0.0219 | 0.0220 |
| λ after 15 w. 70° C. (W/mK) | 0.0247 | 0.0245 | 0.0248 | 0.0252 | 0.0249 | 0.0256 | 0.0252 | 0.0258 | 0.0255 |

*S.E.: self extinguishing

Table 3 shows clearly that the use of 2-chloropropane in combination with the non silicon stabilizer results in foams having a shrinkage behaviour similar to traditional foams based on CFC11, and this in contrast with these foams involving the application of a silicon based surfactant. From these examples it appears furthermore that with the ISO 2796 method no distinction can be made between the foams which are subject to shrinkage and the stable foams. The shrinkage test at 4° C. does indicate a clear distinction. The foam as obtained in example 8 is a foam prepared according to the method described in the Mobay patent No. 656.018 (1964). It will be clear that foams, which are subject to such a shrinkage, are not industrializable. With the present invention (example 9) it is on the contrary possible to manufacture a foam having shrinkage properties comparable to a Freon 11 (a Du Pont trademark) blown foam. Further, a rather small λ value increase (after 15 weeks at 70° C.) seems to occur, compared with the Freon 11 (a Du Pont trademark) blown foam. From these examples, it appears furthermore that the fire classes of the foams manufactured on basis of 2-chloropropane, do essentielly not differ from the Freon 11 (a Du Pont trademark) blown foam. There has to be mentioned here that the λ values are relatively high since the samples have been manufactured on a laboratory scale. In the next examples, the foams are manufactured with a machine whereby the improved mixing causes a.o. an improvement of the cell structure and thus also of the λ value. An important, addition advantage of 2-chloropropane is the friability reduction at higher 2-chloropropane contents.

EXAMPLE 10-15

In these examples, there has been started from polyols based on aliphatic as well as on aromatic chain initiators and also from polyols being mixtures thereof.

The polyols have comparable hydroxyl numbers which are on average situated at about 530. In these examples, there has been started always from an isocyanate index of 110. Use has been made of 2-chloropropane as blowing agent. The applied formulations are given in Table 4.

The foams have been manufactured in the shape of plates on a double belt machine. A coated glass film of 300 g/m$^2$ has been applied as covering.

The physical properties of the obtained products are given in Table 5. From the latter it appears clearly that the combined use of 2-chloropropane and a non silicon foam stabilizer (in this case LK 443) results in a stable foam having a dimensional stability (at 4° C.) which is superior to all of the other cases. It has to be mentioned that the stability has been evaluated here on the foam without the covering. From these examples, it appears furthermore that the present invention is effective for any polyol, independent of the nature of this polyol. In an analogous way as has been described with respect to examples 1-9, there are obtained foams having a good λ aging behaviour.

TABLE 4

| | Formulatins as used in examples 10-15. | | | | | |
|---|---|---|---|---|---|---|
| Example | 10 | 11 | 12 | 13 | 14 | 15 |
| Composition: | | | | | | |
| Polyol: XZ 95203.00 (1) | 100 | 100 | — | — | — | — |
| Polyol Caradol MD 944 (2) | — | — | 100 | 100 | — | — |
| Polyol Baymer VP PU 1504 (3) | — | — | — | — | 100 | 100 |
| Dimethylmethylfosfonate Silicon | 6 | 6 | 8 | 8 | — | — |
| Stabilizer B 1903 (4) Non silicon | 1.5 | — | 1.5 | — | 1.5 | — |
| Stabilizer LK 443 (5) | — | 0.8 | — | 0.8 | — | 0.8 |
| Water | 0.45 | 0.45 | 1 | | 0.8 | 0.8 |

TABLE 4-continued

| Formulatins as used in examples 10-15. | | | | | | |
|---|---|---|---|---|---|---|
| Example | 10 | 11 | 12 | 13 | 14 | 15 |
| dimethylcyclohexylamine | 2.0 | 2.0 | 1.5 | 1.5 | 3.2 | 3.2 |
| 2-chloropropane | 26 | 26 | 26 | 26 | 26 | 26 |
| MDI 44V40 (3) | 145 | 145 | 159 | 159 | 144 | 144 |

(1) A Dow Chemical trademark
(2) A Shell trademark
(3) A Bayer trademark
(4) A Th. Goldschmidt AG trademark
(5) An Air Products trademark.

TABLE 5

| Physical properties of the foams manufactured in examples 10-15. | | | | | | |
|---|---|---|---|---|---|---|
| Example | 10 | 11 | 12 | 13 | 14 | 15 |
| Physical property | | | | | | |
| Core density (kg/m$^3$) | 27.4 | 27.6 | 28.1 | 27.5 | 28.3 | 28.0 |
| Hardness (kPa) | 162 | 174 | 187 | 161 | 171 | 163 |
| Shrinkage at 4° C. (%) | 8.3 | 1.5 | 6.8 | 1.2 | 6.9 | 1.3 |
| Fire class ATSM D1692 | S.E.(*) | S.E. | S.E. | S.E. | S.E. | S.E. |
| DIN 4201 (5) | B3 | B3 | B2 | B2 | B2 | B3 |
| LOI ASTM D2863 | 23 | 22 | 25 | 24.5 | 24 | 24 |
| Friability | 3.1 | 3.4 | 2.9 | 2.4 | 2.9 | 3.1 |
| λ initial | 0.0189 | 0.0186 | 0.0172 | 0.0174 | 0.0180 | 0.0180 |
| λ after 15 w 70° C. | 0.0239 | 0.0241 | 0.0232 | 0.0237 | 0.0242 | 0.0236 |

(*) S.E.: self extinguishing

EXAMPLES 16-22

In these examples, there are made large blocks with dimensions of 2 m×0.60 m×0.60 m. There has been started from mixtures wherein a combination of a sorbitol based polyetherpolyol and a polyesterpolyol based on phosphorous acid have been applied. 2-Chloropropane has been used in each case as blowing agent, but at decreasing concentration so that foam densities typically of 30 kg/m$^3$ to 75 kg/m$^3$ have been obtained. As isocyanate, use has been made of a prepolymerized isocyanate having an equivalent weight of about 150.

The formulations are given in Table 6.

TABLE 6

| Formulations as used in examples 16-22. | | | | | | | |
|---|---|---|---|---|---|---|---|
| Example | 16 | 17 | 18 | 19 | 20 | 21 | 22 |
| Composition | | | | | | | |
| Polyetherpolyol | 75 | 75 | 75 | 75 | 75 | 75 | 75 |
| Polyesterpolyol | 25 | 25 | 25 | 25 | 25 | 25 | 25 |
| LK 221 (*) | 1.7 | 1.7 | 1.7 | 1.7 | 1.7 | 1.7 | 1.7 |
| Diethylamine | 1.75 | 1.75 | 1.75 | 1.80 | 1.80 | 1.90 | 1.95 |
| Sn octoaat | 0.05 | 0.05 | 0.05 | 0.05 | 0.05 | 0.05 | 0.05 |
| K octoaat | 0.5 | 0.5 | 0.4 | 0.4 | 0.3 | 0.3 | 0.3 |
| 2-chloropropane | 22.2 | 19.2 | 16.8 | 15.0 | 12.3 | 10.2 | 7.9 |
| Polymer MDI | 142 | 142 | 142 | 142 | 142 | 142 | 142 |

(*) An air Products trademark

TABLE 7

| Physical properties of the foams manufactured in examples 16-22 | | | | | | | |
|---|---|---|---|---|---|---|---|
| Example | 16 | 17 | 18 | 19 | 20 | 21 | 22 |
| Physical property | | | | | | | |
| Core density (kg/m$^3$) | 30.7 | 34.9 | 41.2 | 45.6 | 49.8 | 60.2 | 75.6 |
| Hardness (kPa) | 152 | 182 | 264 | 292 | 330 | 483 | 634 |
| Closed cells (%) | 91 | 91 | 90 | 92 | 92 | 91 | 91 |
| Friability (%) | 14.7 | 12.8 | 12.4 | 10.2 | 9.2 | 8.7 | 6.0 |
| Shrinkage at 4° C. (%) | 1.3 | 0.9 | 0.5 | 0.4 | 0.4 | 0.2 | 0.2 |
| λ initial (W/mK) | 0.0199 | 0.0208 | 0.0210 | 0.0207 | 0.0210 | 0.0215 | 0.0220 |
| λ after 15 w 70° C. (W/mK) | 0.0232 | 0.0239 | 0.0239 | 0.0244 | 0.0250 | 0.0249 | 0.0260 |
| Fire test DIN 4102 | B3 | B3 | B3 | B3 | B3 | B3 | B3 |
| LOI | 22 | 22 | 22 | 22 | 22 | 22 | 22 |

The physical properties are summed up in Table 7. It appears from the latter that 2-chloropropane can also be used for the manufacturing of blocks whereby densities of 30-80 kg/cm$^3$ can be obtained.

The advantage of 2-chloropropane in combination with the cell stabilizers as described hereabove, resides in the fact that shrink-proof and stable foams are obtained which present furthermore an excellent aging behaviour as a result of which the conductivity coefficient remains relatively reduced in time.

EXAMPLES 23-26

In these examples, a formulation analogous to the one described in example 14, has been used. The foam has been manufactured in a discontinuous way, the reacting mixture having been injected between two rigid coverings (steel and polyester plate). In this example, four different thicknesses have been manufactured, a different densification factor being applied, as shown in Table 8, dependent upon the thickness.

TABLE 8

| Densification factors and densities as used in examples 23-26 | | | | |
|---|---|---|---|---|
| Example | 23 | 24 | 25 | 26 |
| Thickness (mm) | 60 | 90 | 160 | 200 |

TABLE 8-continued

Densification factors and densities as used in examples 23-26

| Example | 23 | 24 | 25 | 26 |
|---|---|---|---|---|
| Densification factor | 1.43 | 1.28 | 1.22 | 1.20 |
| Core density (kg/cm³) | 42.4 | 41.0 | 38.9 | 38.2 |

The obtained panels present excellent mechanical properties. The bond of the polyurethane to the coverings was similar to the one obtained in the cases wherein Freon 11 (a Du Pont trademark) has been used.

EXAMPLE 27

In this example, a formula having an isocyanate index of 250 has been used. There has been started from a polyesterpolyol as shown in Table 9.

TABLE 9

| Formulation as used in Example 27 | |
|---|---|
| Polyol Chardol 336 A (a) | 100 |
| Non silicon stabilizer Fomrez M 66-82A (b) | 1.5 |
| Catalyst TMR 30 (c) | 0.2 |
| K octoate | 1.6 |
| 2-chloropropane | 16 |
| MDI (44V20) (d) | 138 |

(a) A Chardanol trademark
(b) A Witco trademark
(c) An Air Products trademark
(d) A Bayer trademark.

The foams described in these examples have been manufactured on a machine by which the two components (in this case a mixture of, on the one hand, polyol, catalyst, cell stabilizer and MDI on the other hand) are mixed under high pressure in a mixing chamber and subsequently spread out in a mould on a covering consisting mainly of aluminium covered with a polyethylene layer. Afterwards, the mould has been closed and opened again after about 5 minutes. In this way, foam plates of 40 cm×40 cm×5 cm were obtained.

The physical properties of the foam are given in Table 10.

TABLE 10

| Physical properties of the foam as manufactured in Example 27. | |
|---|---|
| Core density (kg/cm³) | 40 |
| Hardness (kPa) | 250 |
| Fire tests ASTM D1692 | self extinguishing |
| Fire test DIN 4102 | B2 |
| LOI | 25 |
| Closed cells (%) | 92.7 |
| Shrinkage at 4° C. (%) | 1.8 |
| λ initial | 0.0210 |
| λ after 15 w. 70° C. | 0.0249 |

From this table it appears that also polyisocyanurate foams can be manufactured by means of this technology which are not any more subject to shrinkage.

EXAMPLE 28

In this example, there has been started from a formulation which is mainly used in spray applications. The formulation is given in Table 11.

TABLE 11

| Formulation as used in Example 28 | |
|---|---|
| Polyol Acrol 3750 (*) | 34.2 |
| Dibutyltindilaurate | 0.2 |
| Stabilizer LK 443 (**) | 0.3 |
| 2-chloropropane | 8.6 |
| Polymeric isocyanate | 50.9 |

(*) An Arco trademark
(**) An Air Products trademark

The foams showed a good insulation value (λ=0.0190 W/mK) and an excellent aging behaviour (λ after 15 weeks at 70° C.=0.0228 W/mK).

This example indicates that chloropropane, especially 2-chloropropane, can be used as blowing agent in spray applications.

EXAMPLES 29-38

In these examples, foams have been manufactured which are analogous to the foam described in Example 8. However, there has been started from a series of non silicon based stabilizers. The used products are typical examples of the products as described hereabove. The evaluation criterion was always the shrinkage determined at 40° C.

| Example | Stabilizer | Shrinkage at 4° C. (%) |
|---|---|---|
| 29 | $C_8H_{17}-O-(CH_2-CH_2-O)-H$ | 2.0 |
| 30 | oleaatester van sorbitan + 12 mol EO | 1.7 |
| 31 | $C_{17}H_{35}-\underset{\underset{O}{\parallel}}{C}-O-(CH_2-CH_2-O)_5-H$ | 1.5 |
| 32 | $C_{12}H_{23}-O-(CH_2-CH_2-O)_9H$ | 1.9 |
| 33 | $C_{17}H_{35}COOCH_2CH_2NHCH_2CH_2OH$ + 2 mol EO | 2.1 |
| 34 | $C_{18}H_{35}-NH_2$ + 8 mol EO | 1.6 |
| 35 | $(CH_3)_2CHCH_2-\underset{\underset{OH}{\vert}}{\overset{\overset{CH_3}{\vert}}{C}}-C\equiv C-\underset{\underset{OH}{\vert}}{\overset{\overset{CH_3}{\vert}}{C}}-CH_2CH(CH_3)_2$ + 10 mol EO | 1.9 |
| 36 | $C_{12}H_{25}OSO_3^\ominus K^\oplus$ | 2.1* |
| 37 | Natriumdioctylsulfosuccinaat | 2.0 |
| 38 | $C_{12}H_{25}NH_3^{\oplus\ominus}OOC-C_{17}H_{33}$ | 1.8 |

It appears that the shrinkage is always considerably smaller than the one obtained in Example 8 (Table 3).

EXAMPLE 39

In this example use has been made of 1-chloropropane as blowing agent. The foam has been manufactured in a similar way as the one described in Example 18, the 2-chloropropane being replaced by equal amounts of 1-chloropropane. The properties of this foam are similar to the ones as given in Table 1.

What is claimed is:

1. A method for preparing hard polyurethane and polyisocyanurate foams wherein an isocyanate and an active hydrogen containing compound are made to react in the presence of a catalyst, a foam stabilizer and a blowing agent which contains chloropropane, said foam stabilizer comprises for the most part a non silicon foam stabilizer.

2. A method according to claim 1, wherein foam stabilizer comprises a non silicon based component containing at least one copolymer having following general structural formula:

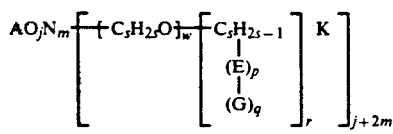

wherein:
A is a cyclic or acyclic group having:
  1 to 12 carbon atoms,
  2 to hydrogen atoms,
  0 to 4 oxygen atoms,
  0 to 2 nitrogen atoms,
E is a group having as a general structural formula:

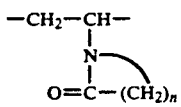

wherein n = 3 to 5,
G is a group having as a general structural formula:

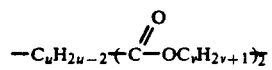

wherein
u = 2 or 3
v = 2 to 9,
K is selected from the group consisting of:

R—, R—CO—, RHNCO—, ROC(CH$_3$)H—, and

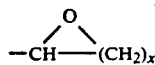

wherein R is an acyclic or cyclic radical having 1 to 18 carbon atoms and x = 3 or 4,
wherein further:
j = 0 to 8
m = 0 to 4
1 ≤ j+m ≤ 9
s = 2 to 4
w = 1 to 200
p = 1 to 10
q = 1 to 10
r = 1 to 50.

3. A method according to claim 12, wherein A is a hydrocarbon radical having 2 to 26—j hydrogen atoms and wherein m equals 0.

4. A method according to claim 1, wherein said foam stabilizer comprises a non ionic, non silicon based foam stabilizer consisting of at least one of the following components:
   condensation products of alkylphenols with ethylene oxide having as general structural formula:

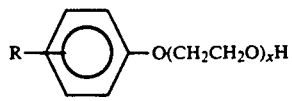

wherein R comprises 8 to 14 C atoms and x varies from 1 to 40 -mono-, di- or tri-esters of condensation products of sorbitan with ethylene oxide;
condensation products of fatty acids with ethylene oxide;
condensation products of alcohols with ethylene oxide, with a hydrophobic chain containing usually 12 to 18 C atoms and being condensed with (n-3) moles ethylene oxide (n indicating the number of C atoms of the hydrophobic chain);
condensation products of amides with ethylene oxide;
condensation products of amines with ethylene oxide;
condensation products of mercaptane derivatives and ethylene oxide;
acetylene derivatives
   condensed with 0 to 40 moles of ethylene oxide.

5. A method according to claim 1, wherein said foam stabilizer comprises an anionic stabilizer selected from the group consisting of at least one of following components:

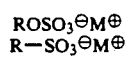

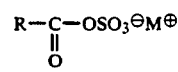

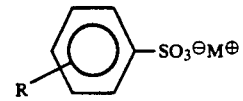

wherein R is an alkyl radical having 8 to 20 C atoms and wherein M⊕ represents a counterion.

6. A method according to claim 1, wherein said foam stabilizer contains a cationic stabilizer comprising quaternary ammonium salts.

7. A method according to claim 1 wherein said foam stabilizer contains only non silicon based components.

8. A method according to claim 1 wherein 0.01 to 10 parts by weight of said foam stabilizer per 100 parts by weight polyol is added before foaming is performed.

9. A method according to claim 1 wherein a physical blowing agent comprising for the most part 2-chloropropane added before foaming is performed.

10. A method according to claim 9, wherein said physical blowing agent comprises at least 90% 2-chloropropane.

11. A method according to claim 10, wherein said physical blowing agent consists entirely of 2-chloropropane.

* * * * *

UNITED STATES PATENT AND TRADEMARK OFFICE
CERTIFICATE OF CORRECTION

PATENT NO. : 5,132,332
DATED : July 21, 1992
INVENTOR(S) : Wallaeys et al

It is certified that error appears in the above-identified patent and that said Letters Patent is hereby corrected as shown below:

In claim 2, at line 16 thereof (at line 12 of column 13), after "to" insert -- {26-(j+m)} --.

In claim 5, below the formula " 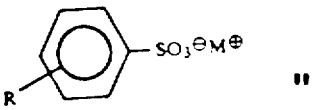 " (at line 40 of column 14), insert -- $(\varnothing)_x\text{-}CH_2OSO_3^{\ominus}M^{\oplus}$ --.

Signed and Sealed this

Fifth Day of October, 1993

Attest:

BRUCE LEHMAN

Attesting Officer    Commissioner of Patents and Trademarks